US008433855B2

(12) United States Patent
Alexander et al.

(10) Patent No.: US 8,433,855 B2
(45) Date of Patent: Apr. 30, 2013

(54) SERIALIZING TRANSLATION LOOKASIDE BUFFER ACCESS AROUND ADDRESS TRANSLATION PARAMETER MODIFICATION

(75) Inventors: Gregory W. Alexander, Pflugerville, TX (US); Lisa C. Heller, Rhineback, NY (US); Chung-Lung Kevin Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 12/032,178

(22) Filed: Feb. 15, 2008

(65) Prior Publication Data

US 2009/0210650 A1    Aug. 20, 2009

(51) Int. Cl.
  *G06F 12/00* (2006.01)
(52) U.S. Cl.
  USPC ............ 711/141; 711/207; 712/208; 712/214
(58) Field of Classification Search .................. 711/207, 711/141; 712/208, 214
  See application file for complete search history.

(56) References Cited

U.S. PATENT DOCUMENTS

| 5,280,593 | A | * | 1/1994 | Bullions et al. ............... 712/208 |
| 5,377,336 | A | * | 12/1994 | Eickemeyer et al. ......... 712/207 |
| 5,564,111 | A | * | 10/1996 | Glew et al. ...................... 714/53 |
| 5,673,391 | A | | 9/1997 | Webb et al. |
| 5,802,359 | A | | 9/1998 | Webb et al. |
| 5,819,078 | A | | 10/1998 | Farrell et al. |
| 6,079,013 | A | | 6/2000 | Webb et al. |
| 6,108,776 | A | | 8/2000 | Check et al. |
| 6,119,219 | A | | 9/2000 | Webb et al. |
| 6,125,444 | A | | 9/2000 | Check et al. |
| 6,938,148 | B2 | | 8/2005 | Moore et al. |
| 7,454,590 | B2 | * | 11/2008 | Jordan et al. .................. 711/207 |
| 7,721,067 | B2 | * | 5/2010 | Kopec et al. .................. 711/205 |

OTHER PUBLICATIONS z/Architecture. "Principles of Operation". Sixth Edition (Apr. 2007). IBM. 1218 pages.
Krager, "Performance and Security Lessons Learned for Virtualizing the Alpha Processor", ISCA'07 Jun. 9-13, 2007, San Diego, California, USA. pp. 392-401.
Andrews, et al. "Migrating a CISC Computer Family onto RISC via Object Code Translation". Tandem Computers Incorporated. 1992 ACM. pp. 213-222.
Sarangi, et al. "Phoenix: Detecting and Recovering from Permanent Processor Design Bugs with Programmable Hardware". The 39th Annual IEEE/ACM International Symposium on Microarchitecture (MICRO 06). 12 pages.
Heller, et al. "Millicode in an IBM zSeries processor". IBM J. Res & Dev. vol. 48. No. 3/4 May/Jul. 2004. pp. 425-434.

* cited by examiner

*Primary Examiner* — Kalpit Parikh
(74) *Attorney, Agent, or Firm* — Cantor Colburn LLP; John Campbell

(57) ABSTRACT

Embodiments of the invention include a method of synchronizing translation changes in a processor including a translation lookaside buffer, the method including setting a control bit to enable blocking of all fetch requests that miss the translation lookaside buffer without changing a translation state of the current process; if there is at least one pending translation, then waiting for completion of the at least one pending translation; and resetting the control bit. A processor and a computer program product are provided.

18 Claims, 2 Drawing Sheets

SERIALIZING TRANSLATION LOOKASIDE BUFFER ACCESS AROUND ADDRESS TRANSLATION PARAMETER MODIFICATION

BACKGROUND OF THE INVENTION

This invention relates generally to handling of memory address reassignment within a millicode capable processor and more particularly to dynamic address translation with use of a translation lookaside buffer (TLB).

Dynamic address translation (DAT) is a process defined in a computer architecture that relates to a mapping process. The process provides for converting a logical (i.e., virtual) address used in software to the actual absolute (i.e., physical) address used in a hardware memory subsystem of the computer architecture. That is, in some computer architectures, instructions are provided to software, in particular operating systems, to change architectural states for a specific number of processes (e.g. updating of control registers, or invalidation of translation tables or access keys). Note that for convention, the terminology "architectural states," "translation control information," "translation information" and other similar terms make reference to or generally include page tables, control registers, TLB entries, and other architected or non-architected translation control state(s).

These changes in turn can affect dynamic address translations (DAT) results. It is important that architectural states can be changed quickly in a processor. On the other hand, since the update process to architectural states can be complicated, due to the nature of direct hardware involvement, these instructions are often times implemented in internal code of the processor, such as by millicode.

A typical processor includes a branch prediction unit that can fetch ahead instructions that are currently executing. These fetches in turns can miss a translation lookaside buffer (TLB) and ultimately require address translation. A complication arises during the execution of updates to the control register by use of millicode process. That is, while the millicode is updating the control registers, these "fetch ahead" translation misses can be in progress, or being initiated due to the asynchronous nature of branch prediction and instruction fetching. This often times can result in an illegal translation stored into a translation lookaside buffer of the processor, or generation of illegal states within a hardware translation engine.

For convention, a Translation Lookaside Buffer (TLB) is a fast speed memory structure in a processor. The TLB is used by memory management hardware to improve the speed of virtual address translation. Generally, the TLB has a fixed number of slots containing page table entries, which map virtual addresses onto physical addresses. It is typically a content-addressable memory (CAM), wherein a search key is the virtual address and a search result is a physical address. If a requested address is present in the TLB, the CAM search yields a match very quickly, after which the physical address can be used to access memory. The TLB can also be implemented in a set associative manner. If the requested address is not in the TLB, the translation proceeds using a page table, which is slower to access. Furthermore, translation takes significantly longer if the translation tables are swapped out into secondary storage.

The TLB references physical memory addresses in its table. The TLB may reside between the processor and the processor cache or between the processor cache and primary storage memory. This depends on whether the cache uses physical or virtual addressing. If the cache is virtually addressed, requests are sent directly from the processor to the cache, which then accesses the TLB as necessary. If the cache is physically addressed, the processor does a TLB lookup on every memory operation, and the resulting physical address is sent to the cache.

Two schemes for handling TLB misses are commonly found in modern architectures. Those of hardware management and those of software management.

In typical prior art processors using hardware TLB management, the processor examines page tables to see if there is a valid page table entry for the specified virtual address. If an entry exists, it is brought into the TLB and the TLB access is retried: this time the access will hit, and the program can proceed normally. If the processor finds no valid entry for the virtual address in the page tables, it raises a page fault exception, which the operating system must handle. Handling page faults usually involves bringing the requested data into physical memory, setting up a page table entry to map the faulting virtual address to the correct physical address, and restarting the program.

Typically, with software-managed TLBs, a TLB miss generates a "TLB miss" exception, and the operating system must examine the page tables and perform the translation in software. The operating system then loads the translation into the TLB and restarts the program from the instruction that caused the TLB miss. As with hardware TLB management, if the operating system does not find a valid translation in the page tables, a page fault has occurred, and the operating system must handle it accordingly.

Serializing around updates of architectural states that may influence translation lookaside buffer data is important to ensure correctness and to prevent illegal data from being stored in the translation lookaside buffer. Typically, existing methods for serializing used inside millicode involve a complex series of drain instructions and branch prediction restrictions to prevent the illegal data from being stored in the translation lookaside buffer. However, these methods can sometimes be ineffective if the processor pipeline is long, and/or if the processor is executing out of order. Solutions usually involve disabling of global branch prediction which possibly leads to unnecessary performance degrades.

What are needed are techniques to enable millicode to be effective in ensuring that no illegal results can be obtained and installed during architectural state updates. Preferably, the techniques take advantage of hardware protections to increase effectiveness.

BRIEF SUMMARY OF THE INVENTION

Embodiments of the invention include a method of synchronizing translation changes in a processor including a translation lookaside buffer, the method including setting a control bit to enable blocking of all fetch requests that miss the translation lookaside buffer without changing a translation state of the current process; if there is at least one pending translation, then waiting for completion of the at least one pending translation; and resetting the control bit.

Also disclosed is an embodiment of a processor including an architecture for synchronizing translation changes in a translation lookaside buffer, the architecture adapted for: setting a control bit to enable blocking of all fetch requests that miss the translation lookaside buffer; if there is at least one pending translation, then waiting for completion of at least one pending translation; and resetting the control bit.

Further disclosed herein is a computer program product stored on machine readable media and including machine executable instructions for synchronizing translation changes in a processor including a translation lookaside buffer and a state bit for setting a block translation state, the product including instructions for: setting the state bit; and clearing the state bit.

BRIEF DESCRIPTION OF THE DRAWINGS

Referring now to the drawings wherein like elements are numbered alike in the several figures, where.

DETAILED DESCRIPTION OF EXEMPLARY EMBODIMENTS

The teachings herein provide a control state implemented in hardware of a processor. The control state can be initiated by at least one of software and firmware. Initiation can be accomplished by use of at least one of directly updating at least one control bit using millicode and by executing newly provided instruction(s) that set and reset (i.e., clear) the control bit(s). The millicode accessible control state is added to a processor to cause the instruction cache, which includes translation lookup hardware for instruction fetches, to prevent any translatable instruction fetches, in particular any new translation lookaside buffer misses, from being processed.

The control state involves a hardware interlock, does not change a program translation state in the program status word and does not prevent the branch prediction logic from trying to make fetches or prefetches with translation on. The control state also does not change how operand fetches are accessed. A similar state can also be designed to affect operand accesses, if there is a need to prevent any hardware operand prefetches from making TLB entries when not desired. Specific instruction sequences are introduced into the processor to ensure that the control bit has taken effect, and to ensure that all outstanding translatable fetches have completed or cancelled prior to millicode execution that will modify translation related information. In some embodiments, the millicode exists in a non-translatable area and therefore instruction processing of the millicode will not be blocked. Not modifying the program status word that allows translated instruction fetch permits faster user program restart once translation information changes are complete.

Use of the control state simplifies implementation of the translation lookaside buffer handling. This is accomplished by allowing translation information changes to be software controlled with minimal hardware interlocks while still preventing corrupt data from entering the translation lookaside buffer or program structures. The control state can also be used as part of a sequence to ensure that instruction fetches observe the translation changes. The control state may be included in a variety of processors, for example, the control state may be used as part of any trusted hypervisor that runs with translation off.

The control state may be set and reset by millicode. In one embodiment, the control bit is set as a "block translation" state. Once "block translation" is set, the Instruction Cache (referred to as the "I-cache", and which includes an Instruction translation lookaside buffer) will block any new instruction fetches that require translation from being serviced (i.e., those requests will be rejected). When a request is rejected, the I-fetching looks for another address to fetch among pending fetches from sources to the I-cache. How I-fetching is accomplished is generally not discussed further in this disclosure.

Figure 1:
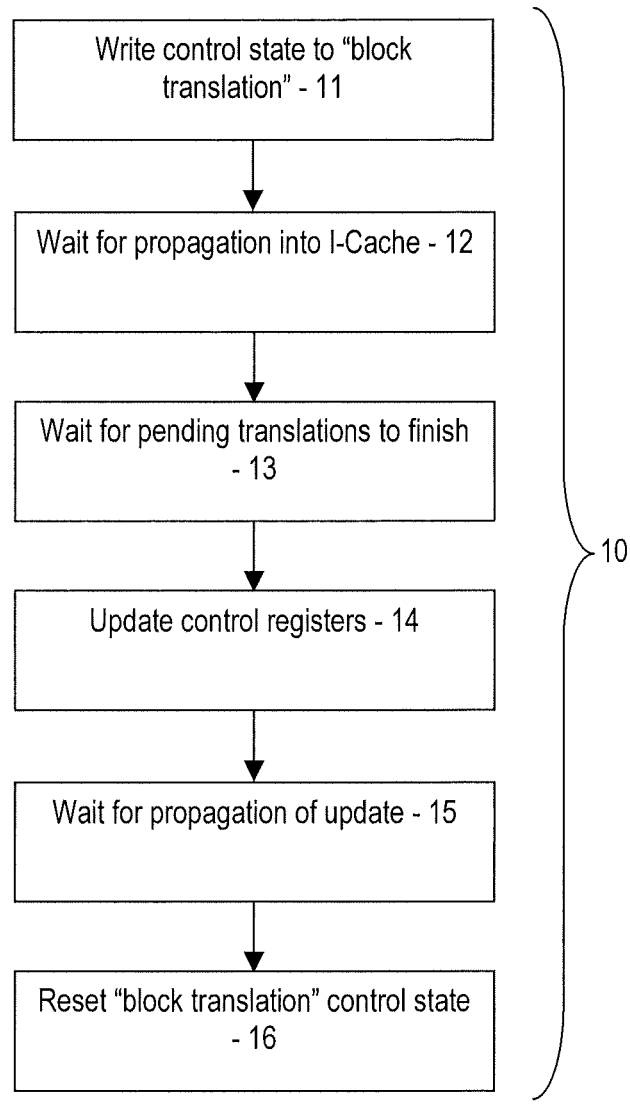
FIG. 1 is a flow chart providing an exemplary process for updating a translation control bit.

By using this bit, millicode can update architectural states that may influence translations, simply called the "translation related control bits," such as by using a code structure as outlined in the exemplary flow chart of FIG. 1.

Referring to FIG. 1, there is shown a flow chart depicting an exemplary process for updating translation control bits with millicode 10. In a first stage 11, the process for updating translation control bits with millicode 10 calls for writing the processor state bit to "block translation." In a second stage 12, the process calls for waiting until the write has been observed in the I-cache logic. Note the waiting usually is for X cycles, where X depends on a design of the processor pipeline. An explicit DRAIN instruction, which blocks instruction issues until specified conditions are met, can also be provided to have the hardware interlock this update to ensure that I-cache had seen the setting. In a third stage 13, the process calls for waiting for all pending translation to be finished. Again, an explicit DRAIN instruction can be provided for millicode to monitor any outstanding translations. In a fourth stage 14, the process calls for updating translation control bits. That is, update of translation control bits can be completed now that new translation lookaside buffer misses can not be launched (which are blocked by the I-cache) and any outstanding translation lookaside buffer misses are serviced. In a fifth stage 15, the process calls for waiting for update of the translation control bits to be seen by all hardware components. Again, an explicit DRAIN instruction can be provided to have the hardware interlock this update to ensure all concerned units had seen the setting change. In a last stage 16, the process calls for resetting the "block translation" state.

To reduce some of the delays on the "wait" part of the instruction sequence, the processor can provide a simple variation to the above by having its Instruction Decode Unit (IDU) and Instruction Issue Unit (ISU) do most of the interlocking. An exemplary process for reducing the wait time delay is provided in FIG. 2. In an alternate implementation, the hardware in I-cache can also actively cancel any outstanding translations when the "block translation" state is set and this second explicit DRAIN can be avoided. This design is not shown herein.

Figure 2:
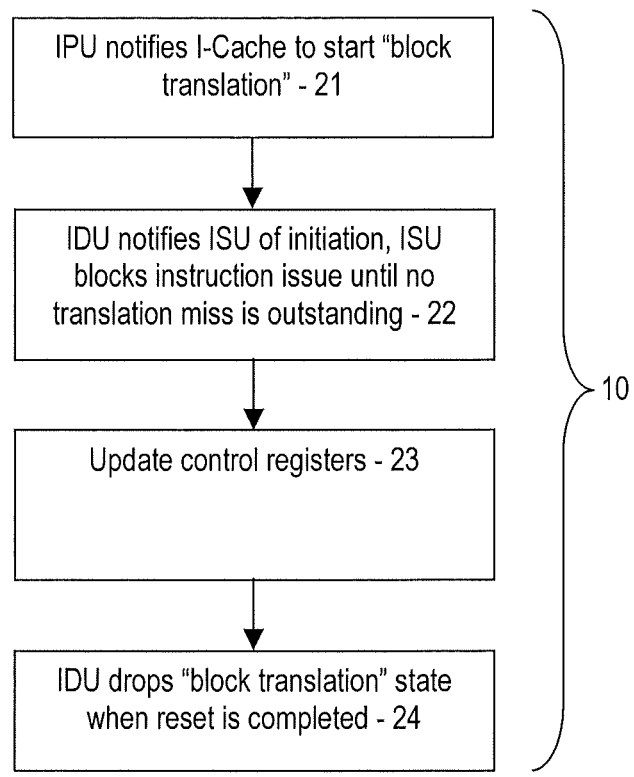
FIG. 2 is another flow chart providing an exemplary process for updating a translation control bit.

FIG. 2 provides a flow chart with another exemplary embodiment of the process for updating translation control bits with millicode 10. In this embodiment, in a first stage 21, the instruction decode unit notifies the I-cache to start "block translation" when an instruction for initiation is decoded. In a second stage 22, the instruction decode unit notifies the instruction issue unit of initiation, and the instruction issue unit stops the "block translation" instruction and any subsequent instructions from being issued until no existing translation miss is outstanding. The hardware will cover the necessary communication delays to ensure that once the "block translation" is issued no new translation lookaside buffer miss will be serviced. Subsequently, in a third stage 23, updating of control registers is performed. In a fourth stage 24, the instruction decode unit drops the "block translation" state only when a "reset block translation" instruction is executed and completed.

The millicode, in a simple form can provide for: writing the processor state bit to "block translation"; updating achitectural states that can affect translation; waiting for a control register update to be seen by all hardware; and resetting the "block translation" state. The architecture of the processor can include a design for reducing wait cycles. Of course, other embodiments may be realized as well.

Technical effects and benefits include techniques to enable millicode to be effective in ensuring that no illegal results can be obtained and installed during control register updates. The techniques may take advantage of hardware protections to increase effectiveness.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of synchronizing translation changes in a processor comprising a translation lookaside buffer (TLB) and a control register having translation related control bits configurable as architectural states, the method comprising:

notifying an instruction cache by an instruction decode unit to start blocking of all fetch requests that miss the TLB based on decoding an instruction for initiation of a block translation state, the instruction configured to set a control bit to enable the blocking;

notifying an instruction issue unit by the instruction decode unit of the initiation;

based on the notifying of the initiation, stopping issuing of instructions by the instruction issue unit until all pending TLB misses have been processed;

waiting for completion of all pending TLB misses to be processed by the processor;

setting the control bit to enable the blocking of all fetch requests that miss the TLB, the setting performed by the processor without changing a translation state of a current process, the setting of the control bit directly performed by execution of at least one of software and firmware;

based on the control bit being set, servicing incoming fetch requests by the processor that do not miss the TLB and preventing launching of TLB miss updates, the servicing of incoming fetch requests configured to service incoming fetch requests received subsequent to a blocked fetch request that misses the TLB;

updating an architectural state by the processor to change a state of one or more of the translation related control bits while the control bit is set to enable the blocking of all fetch requests that miss the TLB, wherein illegal results of translations being installed in the TLB based on changing translation related fields are avoided; and resetting the control bit by the processor based on completion of the updating and dropping the block translation state by the instruction decode unit based on executing a reset block translation instruction, thereby disabling the blocking of all fetch requests that miss the TLB.

2. The method as in claim 1, further comprising at least one of:

setting the control bit before changing translation control information; and resetting the control bit after changing translation control information.

3. The method as in claim 2, further comprising executing at least one instruction for discarding translated prefetched instructions.

4. The method as in claim 2, further comprising executing at least one instruction for stalling execution when at least one translated fetch request is being serviced.

5. The method as in claim 4, further comprising executing at least one instruction for stalling execution until all translated fetch requests made prior to setting the control bit have completed.

6. The method as in claim 5, wherein the at least one instruction comprises at least one of: an instruction that stalls execution for a fixed number of cycles and an instruction that stalls execution when a translated request has missed one of a cache and the translation lookaside buffer.

7. The method as in claim 1, wherein setting the control bit causes a cache to reject all fetch requests that require translation.

8. The method as in claim 1, further comprising executing instructions to ensure changes for at least one of a synchronous TLB and a control state, the instructions comprising instructions comprising at least one of:

setting a control bit to prevent fetches that require address translation;

executing an instruction from a sequence of instructions to stall execution until all translated fetch requests made prior to setting the control bit take effect have completed;

changing at least one of translation information and data for the TLB.

9. The method as in claim 8, further comprising discarding translated prefetched instructions after stalling execution and prior to clearing the control bit.

10. The method as in claim 1, further comprising:

implementing a DRAIN instruction to at least one of:

ensuring that instruction cache logic has observed the setting by using a hardware interlock;

monitoring any outstanding translations with millicode; and ensuring the other hardware components have observed the translation control state updates.

11. A processor comprising an architecture for synchronizing translation state changes in a translation lookaside buffer (TLB) and a control register having translation related control bits configurable as architectural states, the architecture configured to perform a method, comprising:

notifying an instruction cache by an instruction decode unit to start blocking of all fetch requests that miss the TLB based on decoding an instruction for initiation of a block translation state, the instruction configured to set a control bit to enable the blocking;

notifying an instruction issue unit by the instruction decode unit of the initiation;

based on the notifying of the initiation, stopping issuing of instructions by the instruction issue unit until all pending TLB misses have been processed;

waiting for completion of all pending TLB misses to be processed by the processor;

setting the control bit to enable the blocking of all fetch requests that miss the TLB, the setting performed by the processor without changing a translation state of a current process, the setting of the control bit directly performed by execution of at least one of software and firmware;

based on the control bit being set, servicing incoming fetch requests by the processor that do not miss the TLB and preventing launching of TLB miss updates, the servicing of incoming fetch requests configured to service incoming fetch requests received subsequent to a blocked fetch request that misses the TLB;

updating an architectural state by the processor to change a state of one or more of the translation related control bits while the control bit is set to enable blocking of all fetch requests that miss the TLB, wherein illegal results of translations being installed in the TLB based on changing translation related fields are avoided; and resetting the control bit by the processor based on completion of the updating and dropping the block translation state by the instruction decode unit based on executing a reset block translation instruction, thereby disabling the blocking of all fetch requests that miss the TLB.

12. The processor as in claim 11, comprising millicode for initiating the setting, waiting and resetting.

13. The processor as in claim 11, further configured to provide a hardware interlock.

14. A computer program product comprising a tangible non-transitory machine readable storage media, the storage media comprising machine executable instructions executable by a processor to perform a method for synchronizing translation state changes in the processor, the processor comprising a translation lookaside buffer (TLB) and a control register having translation related control bits configurable as architectural states, the method comprising:

notifying an instruction cache by an instruction decode unit to start blocking of all fetch requests that miss the TLB based on decoding an instruction for initiation of a block translation state, the instruction configured to set a control bit to enable the blocking;

notifying an instruction issue unit by the instruction decode unit of the initiation;

based on the notifying of the initiation, stopping issuing of instructions by the instruction issue unit until all pending TLB misses have been processed;

waiting for completion of all pending TLB misses to be processed by the processor;

setting the control bit to enable the blocking of all fetch requests that miss the TLB, the setting performed by the processor without changing a translation state of a current process, the setting of the control bit directly performed by execution of the executable instructions;

based on the control bit being set, servicing incoming fetch requests by the processor that do not miss the TLB and preventing launching of TLB miss updates, the servicing of incoming fetch requests configured to service incoming fetch requests received subsequent to a blocked fetch request that misses the TLB;

updating an architectural state by the processor to change a state of one or more of the translation related control bits while the control bit is set to enable the blocking of all fetch requests that miss the TLB, wherein illegal results of translations being installed in the TLB based on changing translation related fields are avoided; and resetting the control bit by the processor based on completion of the updating and dropping the block translation state by the instruction decode unit based on executing a reset block translation instruction, thereby disabling the blocking of all fetch requests that miss the TLB.

15. The computer program product as in claim 14, wherein the method further comprises:

setting a state bit, the state bit indicating a blocked translation state;

clearing the state bit; and stalling execution of translated fetch requests made prior to setting the control bit.

16. The computer program product as in claim 15, wherein the method further comprises at least one of:

stalling execution for at least one of a fixed number of cycles of the processor; and stalling execution when a translated request has missed one of a cache and the TLB.

17. The computer program product as in claim 16, wherein the method further comprises discarding translated prefetched instructions.

18. The computer program product as in claim 17, wherein the method further comprises: rejecting all fetch requests that require translation.

* * * * *